Aug. 18, 1925.

C. A. SCHELL 1,550,458

CENTERING DEVICE FOR FLEXIBLE COUPLINGS

Filed Aug. 1, 1922

Inventor:
Carl A. Schell.
by his Attorneys.

Patented Aug. 18, 1925.

1,550,458

UNITED STATES PATENT OFFICE.

CARL A. SCHELL, OF CLEVELAND, OHIO, ASSIGNOR TO THERMOID RUBBER COMPANY, OF HAMILTON TOWNSHIP, NEW JERSEY, A CORPORATION OF NEW JERSEY.

CENTERING DEVICE FOR FLEXIBLE COUPLINGS.

Application filed August 1, 1922. Serial No. 578,893.

*To all whom it may concern:*

Be it known that I, CARL A. SCHELL, a citizen of the United States, residing at Cleveland, Ohio, have invented certain Improvements in Centering Devices for Flexible Couplings, of which the following is a specification.

One object of my invention is to construct a centering device for flexible couplings so that the sliding action and the angular action taken by the ball will be on a common center with the action of the disk assembly in order to reduce the bearing pressures to a minimum.

A further object of the invention is to make the ball of a material that will be softer than the other parts of the centering device so that it will be the part that will wear. This part can be readily replaced when necessary.

Figure 1:
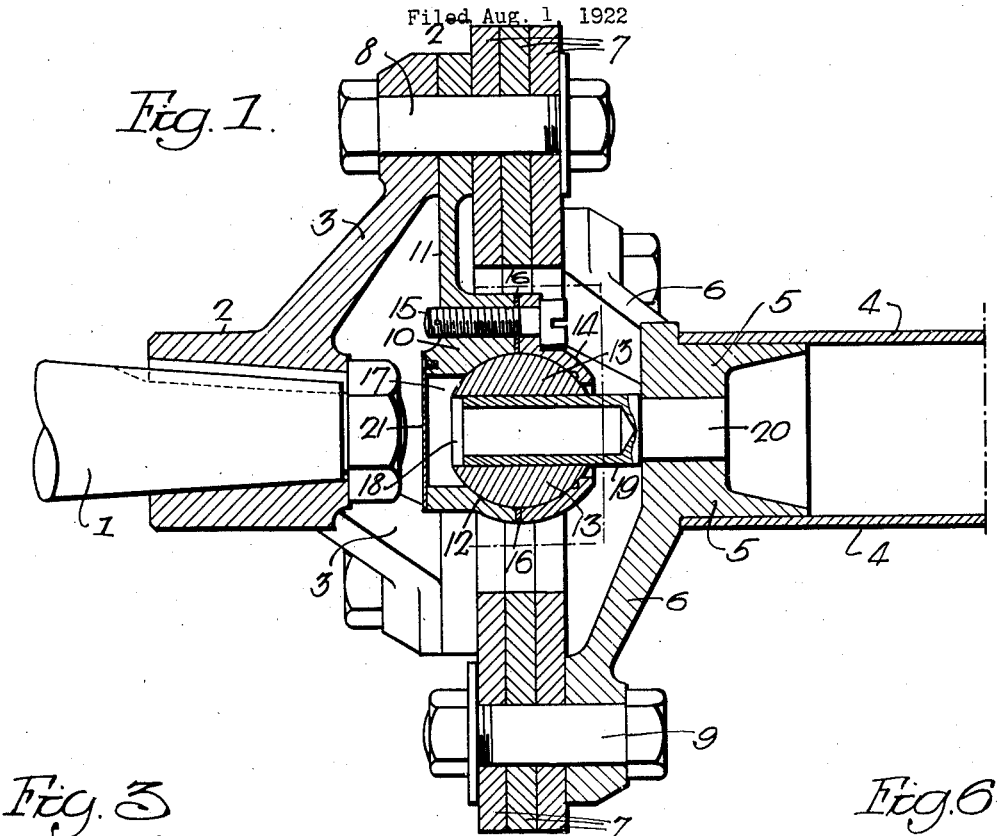
Fig. 1 is a longitudinal sectional view through a flexible coupling illustrating my invention.
Figure 3:
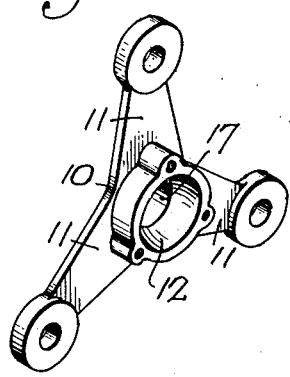
Figure 4:
Figure 6:
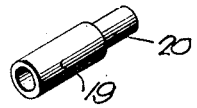
Figure 5:
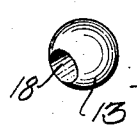
Figure 2:
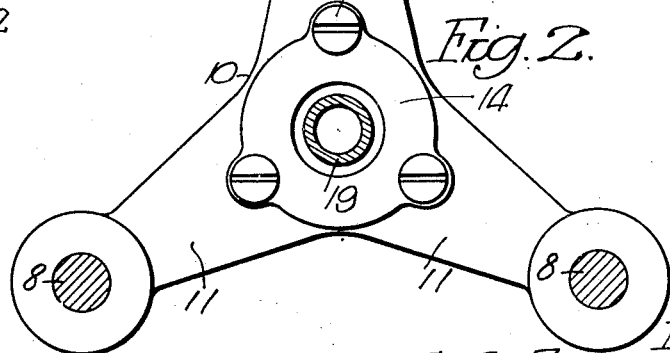
Fig. 2 is a transverse sectional view on the line 2—2, Fig. 1.

Figs. 3 to 6, both inclusive, are detached perspective views illustrating details of my invention.

Referring to the drawings, 1 is a portion of a transmission shaft of an automobile on which is a hub 2 having arms 3. 4 is the driving shaft connecting the transmission shaft with the axle. This shaft is hollow and mounted in one end of the shaft is a hub 5 having arms 6.

7—7 are flexible disks, which are open at the center. These disks are secured to the arms 3 and 6 by bolts 8 and 9. The bolts 8 secure the disks to the arms 3 and the bolts 9 secure the disks to the arms 6.

10 is a socket member having arms 11 corresponding with the arms 3. These arms 11 are perforated for the passage of the bolts 8.

12 is the socket formed in the member 10 at the point of articulation of the coupling. Mounted in the socket is a ball 13. A cap 14 forms a continuation of the socket 12 and is secured to the socket member by bolts 15, or other suitable fastenings. Between the cap and the socket member is a gasket 16 of any suitable material to allow for adjustment when necessary. The socket member has a longitudinal opening 17 at the center and the ball 13 has a longitudinal opening 18 to receive a center pin 19, which is reduced at 20. This portion 20 is driven in an opening in the hub 5. The ball is free to slide and to turn upon the pin. It is also free to turn in the socket 12.

The pin 19 is hollow, as shown, and communicates with the opening 17 in the socket member. The opening 17 in the socket member is closed by a cap plate 21, which is held to the member by screws, or other fastenings.

The ball 13 is preferably made of bronze. The socket member is made of a steel stamping, or a steel casting. The pin is made of hardened steel so that, if wear occurs, it will be on the ball, which can be easily removed and replaced.

Graphite is preferably baked into the surface of the ball to lubricate the bearing surfaces. Lubricant may be placed in the hollow center pin, if found desirable.

By the construction hereinbefore described, the sliding action of the pin in the ball, and the rotation of the ball in the socket, are both on a common center with the action of the disk assembly. This construction materially reduces the bearing pressures and centers the assembly.

While the invention is described as coupled to the transmission shaft and driving shaft of an automobile, it will be understood that it can be used in connection with any driving means where one shaft is flexibly connected to another shaft.

I claim:

The combination in a flexible coupling, of two shafts; a hub secured to each shaft, each hub having arms; a flexible disk located between the arms; two sets of bolts securing the arms to the disks; a socket member having arms through which one set of bolts extend that secure the disk to the arms of one hub, the socket of said socket member being at the center of articulation of the coupling; a ball located in the socket, said ball and socket each having a longitudinal opening therein; a center pin secured to the hub opposite to that to which the socket member is secured, said ball being free to turn on the pin and to turn in the socket, the pin being free to move longitudinally in the ball, said pin being hollow; a cap secured to the socket member and forming a portion of the socket; and a plate closing the opening in the socket member.

CARL A. SCHELL.